Patented Dec. 20, 1938

2,140,608

UNITED STATES PATENT OFFICE 2,140,608

ORGANIC SULPHOXIDES AND SULPHONES AND PROCESS OF PREPARING THEM

Hanns Ufer, Ludwigshafen-on-the-Rhine, Germany, assignor to I. G. Farbenindustrie Aktiengesellschaft, Frankfort-on-the-Main, Germany No Drawing. Application June 11, 1935, Serial No. 26,091. In Germany June 15, 1934

10 Claims. (Cl. 260—577)

The present invention relates to organic sulphur compounds and a process of producing same.

I have found that organic sulphur compounds capable of wide industrial employment are obtained by causing alkenyl sulphones or sulphoxides to react with compounds containing at least one nitrogen atom bearing one or more reactive hydrogen atoms.

Alkenyl sulphones or sulphoxides are compounds of the general formula $R.SO_2.R_1$ or $R.SO.R_1$ in which R is an alkenyl group, as for example a vinyl or allyl group, and $R_1$ is an alkyl group, as for example an ethyl, propyl, butyl, octodecyl or octadecenyl group, an aryl group, as for example a phenyl group, the radicle of a polynuclear isocyclic or heterocyclic compound e. g. a naphthyl group, an aralkyl group, as for example a benzyl or phenylethyl group, or a cyclo-aliphatic radicle. The groups or radicles may contain as substituents any other further atoms or atomic groups, as for example halogens or alkyl, hydroxyalkyl, nitro, hydroxy or carboxylic groups. As compounds containing at least one nitrogen atom bearing at least one reactive hydrogen atom may be mentioned for example ammonia, primary and secondary alkylamines and hydroxyalkylamines (ethylamine, propylamine, butylamine, octadecylamine, octadecenylamine and mono- and di-hydroxyethylamines), primary and secondary aromatic amines (aniline, phenylene diamine, naphthylamine and aminoanthraquinone), monoamines or polyamines of other isocyclic and heterocyclic compounds, aralkylamines (phenylethylamine) and cycloaliphatic amines (cyclohexylamine) and their mono-N-alkyl, hydroxyalkyl, aryl, aralkyl and acyl compounds. Furthermore compounds having at least one NH-group combined in the form of a ring, as for example piperidine or carbazole, may be employed. The said compounds may also contain halogen atoms, tertiary combined nitrogen atoms or alkyl, hydroxyalkyl, nitro, hydroxyl or carboxylic acid groups.

The reaction usually consists of an addition of the unsaturated radicle contained in the sulphone employed to the nitrogen-hydrogen radicle, the number of radicles being thus added depending on the number of free hydrogen atoms in the nitrogen-hydrogen radicle, on the working conditions and on the properties of the initial materials.

It is advantageous to employ for the reaction elevated temperatures, as for example from 60° to 200° C., in particular from 100° to 160° C. The employment of diluents, such as alcohols (ethyl, propyl or benzyl alcohol), ketones (acetophenone) ethers (dibenzyl ether), hydrocarbons (toluene or xylene), or halogen hydrocarbons (chlorbenzene) is frequently of advantage. In many cases it is preferable to employ catalysts which favor the reaction. Especially suitable for this purpose are substances having a basic character as for example small amounts of alkali metal or alkaline earth metal oxides, hydroxides, sulphides, carbonates, acetates, phenolates, alcoholates and mercaptides, zinc oxide, cadmium oxide, or substances acting like bases in the present reaction such as salts of zinc or cadmium with organic acids, especially acetic acid, furthermore similar amounts of organic bases such as pyridine or dimethylaniline. The reaction may be carried out at ordinary or increased pressure depending on the boiling point of the initial material or of the diluent.

The compounds obtained may be used for the preparation of dyestuffs or, when suitable initial materials are selected, as dyestuffs themselves, or as assistants for the textile and related industries or for combating animal or vegetable pests.

The following examples will further illustrate how the said invention may be carried out in practice but the invention is not restricted to these examples. The parts are by weight.

Example 1

40 parts of vinyl-para-tolyl sulphone are heated for from 25 to 30 hours on a waterbath under reflux with 300 parts of 10 per cent aqueous ammonia. After separating the aqueous layer, a yellow oil is obtained which dissolves readily in alcohol and ether and slightly in water. By adding hydrochloric acid to the alcoholic solution of the oil, the hydrochloric acid salt is obtained which, after crystallization from alcohol or water, forms colorless needles which melt with decomposition at 200° C. The product is slightly soluble in water and alcohol in the cold and readily soluble upon heating. According to analysis and melting point the product is the known bis-(beta (para-tolyl)sulphon-ethyl)-amine of the formula: $(CH_3.C_6H_4.SO_2.CH_2.CH_2)_2.NH$.

Addition compounds are obtained in a similar manner by the reaction of vinyl-para-tolyl sulphone with monoethanol and diethanol amines.

Example 2

18 parts of vinyl-para-tolyl sulphone are heated for 6 hours under reflux with 60 parts of piperidine. The liquid is then distilled under reduced pressure. The excess piperidine passes over first and then at from 185° to 208° C. (8 millimeters mercury gauge) an oil passes over which is scarcely soluble in water. With hydrochloric acid, the hydrochloric acid salt is obtained which dissolves slightly in cold water and readily in hot water and which therefore may be readily crystallized from water. Analysis gives the formula: $C_{14}H_{21}SO_2N.HCl$. The base is the addition compound of one molecule of each of the initial materials and probably has the formula:

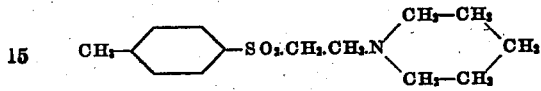

Example 3

18 parts of vinyl-para-tolyl sulphone, 14 parts of beta-naphthylamine and 30 parts of dibenzyl ether are heated under reflux for 10 hours at from 150° to 160° C. When cooled the solution solidifies after some time forming a crystal pulp. The crystals separated from the solvent are scarcely soluble in ligroin, readily soluble in warm alcohol and very readily soluble in benzene, acetone, chloroform, glacial acetic acid, ethyl acetate and pyridine. The resulting base still contains small amounts of unchanged beta-naphthlamine and may be obtained in a pure state by repeated crystallization from alcohol. It melts at 124° C. Analysis gives the composition $C_{19}H_{19}NO_2S$. The constitution of the compound probably corresponds to the formula:

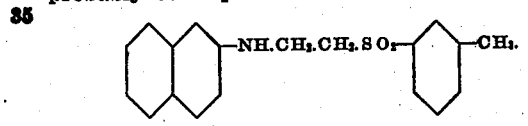

Similar compounds are obtained for example with carbazole or 5-aminoanthrapyrimidine and with other alkenyl sulphones.

Example 4

36 parts of the sodium salt of 1-hydroxy-8-aminonaphthalene-3.6-disulphonic acid are dissolved in 200 parts of water. The solution is adjusted so that it is neutral or at the most only very slightly alkaline to litmus. 19 parts of vinyl-para-tolyl sulphone are then added and the whole heated on a boiling water bath for six hours under reflux. After cooling, any unconverted vinyl-para-tolyl sulphone is filtered off by suction and the aqueous filtrate is evaporated under reduced pressure. The residual mass is dissolved in a little water, hydrochloric acid is added and the resulting precipitate filtered off by suction and extracted with alcohol. The addition compound is thus obtained in a pure form. It is readily soluble in water and may be readily converted for example into its sodium salt.

Other addition compounds of aminohydroxy compounds with vinyl sulphones may be obtained in an analogous manner.

Example 5

60 parts of mono-ethyl aniline are heated for 30 hours with 30 parts of vinyl para-tolyl sulphone to about 100° C. The excess mono-ethyl aniline is then distilled off as completely as possible, at a very low pressure and at a temperature of from 160° to 170° C. at the most, and the residue is recrystallized from cyclohexanone. Colorless crystals are thus obtained which melt at between 71° and 72° C. According to analysis the compound has the formula $C_{17}H_{21}SNO_2$. It is an addition compound of one molecule of each of the initial materials and probably has the formula

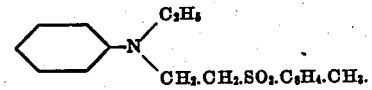

In a similar manner, the addition compounds of vinyl-para-tolyl sulphone and monohydroxy-ethyl aniline (colorless crystals having a melting point of 88° C.), mono-ethyl-meta-toluidine (colorless crystals melting at 70° C.), mono-hydroxy-ethyl-meta-toluidine (colorless needles melting at between 79° and 80° C.) or other bases, as for example monoalkyl-beta-naphthylamines, 2-methoxy-5-methyl-N-hydroxyethylaniline, corresponding to the formula:

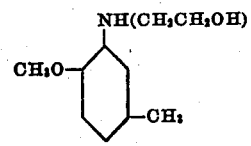

which can be obtained by causing ethylene-chlorhydrin to act on 2-methoxy-5-methylaniline at about 100° C. or other derivatives of aniline containing N-oxyalkyl groups, phenylene diamines, diphenylamine, cyclohexylamine, monoalkyl-, alkoxyaryl, aralkyl-cyclohexylamines and addition compounds with other alkenyl sulphones, can be obtained.

At higher temperatures, for example at from 120° to 150° C. the reaction generally proceeds more rapidly. If the base employed is difficultly distillable, any excess of it must be avoided. In this case, it is preferable to add a solvent which can be removed by distillation at a temperature not above 200° C. and to purify the addition compound in another way in order to avoid decomposition while distilling off the unconverted portion of the base.

Example 6

100 parts of diethylamine are heated for 30 hours with 30 parts of vinyl-para-tolyl sulphone under reflux. After distilling off the excess diethylamine, an oil remains which is purified by dissolving it in alcohol and converting it into the oxalate by addition of a solution of oxalic acid in alcohol. This salt may be further purified by recrystallization from alcohol. It melts at between 165° and 166° C. Analysis gives the formula $C_{15}H_{23}NSO_6$. It probably has the following structure: $CH_3.C_6H_4.SO_2.C_2H_4.N(C_2H_5)_2.C_2O_4H_2$.

Similar addition compounds are obtained with other mono- and dialkyl- or alkoxy amines, for example with dibutylamine (melting point of the oxalate 173° C.) and with other alkylene sulphones.

By introducing a nitro group and reducing it into the amino group compounds are obtained which are suitable for the preparation of dyestuffs. By reacting equal parts of vinyl-para-tolyl sulphones and urea in an aqueous solution an oil is obtained which when repeatedly recrystallized from alcohol is obtained in the form of solid crystals which melt at between 142° and 143° C.

Similar addition compounds may also be obtained by employing urea derivatives, ureathanes, semi-carbazides, hydrazines, carbamic acid or aminoalkylsulphonic acids with one or more free hydrogen atoms attached to nitrogen and with other vinyl sulphones.

funnel shaped portion 110 into which undistilled liquid drops and is conveyed to a common conduit 111 by pipes 112. Distillate collecting in gutters 109 flows by gravity into conduits 113 and thence into a common collecting conduit 114. Numeral 115 designates a still cover plate rigidly fixed in gas tight relation to casing 105 by bolts 116 and gasket 117. The cover plate is integral with and supports a plurality of cylindrical vaporizing elements 119 which are shown as being electrically heated as described in connection with Fig. 1. Numeral 118 designates conduits integral with the upper wall of casing 105 which are connected to high vacuum pumps (not shown) which serve to evacuate the still.

Numeral 120 designates a reservoir provided with a withdrawal and introduction valve 125 and communicates at its base with conduit 126, provided with pump 127 and valve 128, which serves to deliver distilland to a flow indicating device 129. Liquid from 129 flows through conduit 130 which delivers it to the distributing heads 131 of each vaporizing column. Reference numeral 132 designates holes in the heads 131 through which the liquid flows onto the heated vaporizing surface of elements 119. A fluid which serves to cool the walls of the condensing element and the undistilled residue falling in elements 110 and conduits 112 is introduced through conduit 133 and withdrawn through conduit 134.

In operation employing the apparatus of Fig. 1, liquid to be distilled for instance cod-liver oil is introduced through 41 into reservoir 16. Opening 41 is then closed and high vacuum pumps such as condensation pumps connected to conduits 39 and 40 put into operation. As the pressure in the still is lowered large volumes of gas and volatile materials absorbed in the oil are given off. Degassing is aided by starting pump 56 which withdraws liquid from the reservoir and forces it into distributing head 36, from which it flows in a thin film down the walls of vaporizing element 22, and falls on to cooling element 45. After degassing has been completed and the pressure lowered to an appropriate value for molecular distillation such as about .001 mm., the heating element 22 is heated to an elevated temperature while circulation of the oil is continued. In order to quickly raise the oil to distilling temperature the first portion of element 22 may be heated to a higher temperature than the lower portion by decreasing the resistance of unit 31.

With cod-liver oil a first fraction is removed at about 118° C. which contains vitamin A alcohol. Molecules evaporating from surface 22 are condensed on walls 10 and flow by gravity into gutter 42 from which they are removed through conduit 43. Undistilled liquid falls from the pointed lowest portion of element 22 on to the cooling element 45, the core 46 of which provides intimate contact between the heated liquid and the cooling element. The liquid in a cooled state, or at any desired temperature determined by the rate of flow and temperature of cooling fluid in conduits 60 and 61, then falls into reservoir 16 and is again re-circulated. Higher boiling fractions are removed at successively elevated temperatures in the same manner, vitamin D being obtained at about 140°–165° and vitamin A esters at about 180°–220° C.

In order to substantially prevent mixing of distilled liquid, with undistilled liquid, or with liquid which has been circulated a lesser number of times, reservoir 16 is preferably of considerable length and rather narrow. As a result there is a tendency for liquid falling from the cooling element to stratify and mixing with undistilled liquid is minimized. This result is made more positive by using the apparatus illustrated in Fig. 2. When using this apparatus, material to be distilled is introduced into reservoir 66. Valve 67 is closed and the liquid from reservoir 66 circulated through the still in the manner described in connection with Fig. 1. Undistilled liquid is collected in reservoir 65. After reservoir 66 has reached a desired low value valve 67 is opened and the contents of 65 allowed to flow into 66. The valve is again closed and the re-circulation continued. The use of the system of reservoirs prevents any possibility of mixing and also enables the exact time of an individual cycle to be measured by the time taken to empty the reservoir. Since the rate of distillation under molecular conditions is proportional to the mol. fraction of the material to be removed from the distilland it is desirable to prevent mixing of distilled material poor in the substance to be separated, with richer undistilled material, or material which has been through the still a lesser number of times.

The operation of the apparatus illustrated in Figs. 6 and 7 is practically the same as that of Fig. 1 except that liquid to be distilled is circulated over a plurality of heated vaporizing elements. Instead of air cooling the condenser walls cooling is effected by circulating cooling fluid such as water through conduits 133 and 134. Since this cooling fluid is also in contact with conduits 112 and flared members 110, undistilled liquid is cooled as it falls from the vaporizing elements and is conveyed to the reservoir.

In operation employing the apparatus of Figs. 3, 4 and 5, liquid to be distilled is introduced into reservoir 91 through valve 98. Vacuum pumps connected to 74 and 75 are started and liquid drawn from 91 by pump 96 and forced into conduits 76. The liquid flows through the small perforations 77 in the bottom of conduits 76 and falls on heating elements 79 which may be warmed to improve the rate of degassing. The liquid falls from elements 79 into gutters 88 and flows through perforations 88, down the cooled walls 84 on to slanted plate 71 which collects and returns it to reservoir 91 by way of conduit 90. After degassing has been completed elements 79 are heated to the distilling temperature of the first fraction and re-cycling continued until it has been removed. Distillate condensing on plates 94 and walls 70 drops onto slanted plate 82 which also acts as a condenser and is delivered to header 93 and withdrawn from the still. Higher boiling fractions are removed in the same manner.

The apparatus illustrated in the various drawings can be constructed of metal or glass or any suitable material. It is apparent that all seals must be substantially gas tight so that a high vacuum can be maintained. The vertical vaporizing elements should preferably be corrugated to aid in distributing distilland thereon in a thin film and prevent its gathering in local streams.

It will be apparent that many changes can be made in the above described structures or in their specific mode of operation without departing from the spirit or scope of my invention. For instance while I have disclosed the apparatus as being equipped with cooling elements it is apparent that in distilling relatively stable compounds such cooling would be unnecessary. In distilling materials of low stability, such as vitamin containing oils, it is important that the contents of the reservoir be below that at which decomposition takes place. The use of cooling elements in such a case is therefore advisable. Instead of using internal vaporizing elements it may be desirable to flow the distilland down a heated external surface and condense distillate upon a smaller centrally located cooled surface. By thus reversing the positions of the vaporizing and condensing surfaces, the condensate is collected upon a smaller area and its rate of drainage thus increased. The number, shape and size of the vaporizing elements can obviously be varied considerably, to conform with the requirements of any particular distillation treatment. By varying the size and length of these elements and the rate of flow of distilland any desired heating period can be obtained. Preferred dimensions are those which enable a short heating period. Thus short columns or heating conduits of relatively small diameter and rapid cooling of undistilled residue lessen the possibility of thermal decomposition.

The essential operating conditions for molecular distillation process are well known and have been described by Burch U. S. Patent 1,955,321; Hickman U. S. Patents 1,942,858, and 1,925,559; Carr British Patent 415,088; "Washburn Bur. St. Jour. Res." 2 478–83 (1929); Carr et al. Nature 131 92 (Jan. 21, 1933) and Bronsted et al. "Philosophical Magazine" 43 31–49 (1922). Pressures below .1 mm. and preferably below .01 mm. such as between .001 and .0001 mm. are usually employed. Distances separating the evaporating and condensing surfaces may be up to twice the mean free path of residual gas. However distances of less than the mean free path give considerably faster distillation rates and are therefore generally used. As the path increases with decrease in pressure there is no limit to the distance which may be employed as long as the pressure used is sufficiently low for the particular distance selected. Usually distances of up to 10 inches such as between ½ and 6 inches have been found to be most satisfactory. Temperatures of between room temperature and 350° C. may be employed. Those temperatures between 50° and 300° C. and especially between 70° and 250° C. are most satisfactory for distilling animal and vegetable oils to obtain vitamin concentrates or pure glycerides.

While I prefer to operate under molecular distillation conditions I have found that distillation under high vacuum is possible where distances of many times the mean free path are used. When operating in this manner it is essential that vaporized molecules have an unrestricted path of travel to the condensing surface. Although such distillation conditions are not actually molecular they are to be understood as being within the scope of my invention.

While I have found it convenient to describe my invention by reference to the distillation of particular materials it is broadly applicable to the distillation of all substances amenable to high vacuum distillation, such as hydrocarbons, drying oils, animal and vegetable glycerides, fats and waxes, etc. My invention is of special value in the molecular distillation of vegetable and animal oils such as cottonseed, tuna-liver, wheat germ, menhaden, halibut-liver, salmon and other fish oils, linseed etc., oils, to obtain fat soluble vitamin concentrates or purified highly unsaturated glycerides.

By operating in accordance with my invention it is possible to regulate and change the distillation to an extent heretofore unattainable. Due to the facility with which distillation conditions can be regulated my invention enables avoidance of overheating or underheating and attendant loss in distillation rate or decomposition. In distilling fish oils it has been found that by using apparatus of the type described, that a much higher yield of vitamin concentrates is obtained than when employing the well known multi-column still in which distilland is passed over a number of successive columns. Furthermore by using this apparatus I have isolated a new antirachitic substance distilling in major amounts at about 194° C. which could not be detected in distillates from the conventional still, apparently because of complete destruction. It is therefore seen that due to the possibility of careful regulation and short heating period that thermal decomposition is avoided to a considerable extent.

Although degassed distilland may be used my invention has the decided advantage that untreated oil may be introduced into the still and the degassing and distillation carried out therein in one treatment. An outstanding advantage of my invention is that fractionation under molecular conditions can be performed without using a series of stills thus greatly decreasing the pieces of apparatus required and eliminating expense and difficulties associated with their operation.

It is to be understood the term "high vacuum" as used in the specification and claims is to be accorded its common meaning in the vacuum art, namely, a pressure of the order of .1 mm. or less.

What I claim is:

1. Distillation apparatus comprising in a closed system a vaporizing surface, a condensing surface disposed opposite thereto in such a manner that free unrestricted space is available for travel of vaporized molecules from the evaporating to the condensing surface, means for maintaining a high vacuum in the space between said surfaces, means for continuously conveying distilland onto the vaporizing surface and means located within the still for quickly cooling undistilled liquid, to below decomposition temperature as it is removed from the vaporizing surface.

2. Distillation apparatus comprising in a closed system a vaporizing surface, a condensing surface disposed in such relation thereto that unrestricted space is available for travel of vaporized molecules from the vaporizing to the condensing surface, means for maintaining a high vacuum in the space between the surfaces, a reservoir for material to be distilled, means for withdrawing material from the reservoir and introducing it onto the evaporating surface and means for immediately cooling undistilled material to below decomposition temperature and returning it to the reservoir.

3. Distillation apparatus comprising in a closed system a vaporizing surface, a condensing surface disposed in such relation thereto that unrestricted space is available for travel of vaporized molecules from the vaporizing to the condensing surface, a reservoir for material to be distilled, means for maintaining a high vacuum over the reservoir and in the space between the evaporating and condensing surfaces, means for continuously withdrawing distilland from the reservoir and circulating it over the evaporating surface and means for quickly and immediately cooling undistilled residue to below decomposition temperature, and returning it to the reserbetween about 60° and about 200° C. a compound of the general formula $R-X-R_1$ in which X stands for a group selected from the class consisting of $-SO-$ and $-SO_2-$, R for an alkenyl group containing up to 3 carbon atoms and $R_1$ for a radicle of the group consisting of aliphatic and cyclo-aliphatic radicals containing at least 6 carbon atoms, aliphatic aromatic and aromatic radicals of the benzene and naphthalene series, with a compound selected from the group consisting of primary and secondary mono-amines and secondary heterocyclic bases in the presence of an alkaline substance acting as catalyst.

6. Organic sulphur compounds corresponding to the general formula

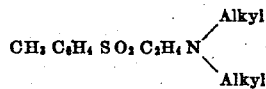

7. The organic sulphur compound having the formula $CH_3.C_6H_4.SO_2.C_2H_4.N(C_2H_5)_2$.

8. Organic sulphur compounds corresponding to the general formula

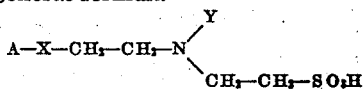

in which A stands for an alkyl group containing at least 12 carbon atoms, X for a group selected from the class consisting of $-SO-$ and $-SO_2-$ and Y for a member of the group consisting of hydrogen and alkyl groups.

9. The organic sulphur compound having the formula

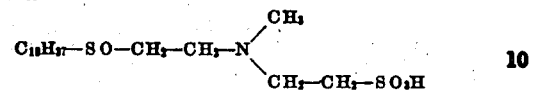

10. Organic sulphur compounds corresponding to the general formula $R_1-X-CH_2-CHY-Z$, in which $R_1$ stands for a radicle of the group consisting of aliphatic and cycloaliphatic hydrocarbon radicles containing at least 6 carbon atoms, aliphatic-aromatic and aromatic hydrocarbon radicles of the benzene and naphthalene series, X stands for a group selected from the class consisting of $-SO-$ and $-SO_2-$, Y stands for a member of the group consisting of hydrogen and the methyl group, and Z stands for a member selected from the group consisting of the primary and secondary mono-amines and secondary heterocyclic bases, the amino nitrogen atom of which is attached to the carbon atom of the grouping CHY.

HANNS UFER.